(12) United States Patent
Maxwell et al.

(10) Patent No.: US 6,389,033 B1
(45) Date of Patent: May 14, 2002

(54) SYSTEM AND METHOD FOR PERFORMING SIGNAL ACCELERATION ON AN AC LINK BUS

(75) Inventors: Conrad A. Maxwell; David P. Braun; George C. Sneed, all of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/237,146

(22) Filed: Jan. 25, 1999

(51) Int. Cl.[7] .............................................. H04L 12/40
(52) U.S. Cl. ...................................... 370/438; 370/489
(58) Field of Search ................................. 370/278, 282, 370/364, 424, 489, 438; 710/100, 107, 126, 127; 379/387, 399

(56) References Cited

U.S. PATENT DOCUMENTS

| | | | | |
|---|---|---|---|---|
| 5,642,422 A | * | 6/1997 | Hon et al. ..................... 381/19 |
| 6,122,220 A | * | 9/2000 | Kim et al. .................. 365/233 |
| 6,122,697 A | * | 9/2000 | Potts ........................... 710/127 |
| 6,147,522 A | * | 11/2000 | Rhode et al. ................. 327/93 |
| 6,167,415 A | * | 12/2000 | Fischer et al. .............. 708/320 |
| 6,175,849 B1 | * | 1/2001 | Smith ......................... 708/320 |
| 6,259,957 B1 | * | 7/2001 | Alexander et al. ............ 700/94 |
| 6,263,075 B1 | * | 7/2001 | Fadavi-Ardekani et al. 379/399 |

* cited by examiner

*Primary Examiner*—Wellington Chin
*Assistant Examiner*—Brenda Pham
(74) *Attorney, Agent, or Firm*—Lyon & Lyon LLP

(57) ABSTRACT

A system and method for performing signal acceleration on data packets communicated across an AC-link bus directly interconnecting a codec to a codec controller. The system positions an accelerator directly in the communication path between the codec and its respective codec controller, so that the accelerator is arranged to receive signals traveling through the AC-link bus. This arrangement allows data manipulation to be performed by the accelerator on the data packets communicated across the AC-link bus, where the processed data packets are output by the accelerator back onto the AC-link bus. The accelerator is arranged to have real-time access to the input and output data streams traveling through the AC-link bus, so that data manipulation can be performed without multiple communications to the codec controller or host computer CPU.

13 Claims, 4 Drawing Sheets

SYSTEM AND METHOD FOR PERFORMING SIGNAL ACCELERATION ON AN AC LINK BUS

BACKGROUND OF THE INVENTION

1. Field of the Invention

The present invention relates generally to the transfer of signals between a codec and a codec controller through an interconnecting bus, and specifically to a system and method for performing signal acceleration on an AC-link bus.

2. Description of Related Art

Personal computers are currently being used for a wide variety of multimedia applications, where it is now becoming desirable for personal computers (PCs) to function with high quality audio performance. Current PC audio architectures are designed to run midrange audio-performance-integrated ISA products. In order to provide PCs with high performance / high quality audio comparable to electronics devices, a new PC architecture capable of providing this performance needed to be developed. Thus, a computer industry consortium developed a new PC audio architecture, the Audio Codec '97 (AC '97), for next-generation audio-intensive PC applications, such as DVD, 3-D multiplayer games, and interactive music. The AC '97 architecture defines a high quality audio architecture for a PC platform to support a wide range of high quality audio solutions, from a 2-channel mix of digital and analog audio inside the PC to multi-channel audio outside the PC. The AC '97 includes at least one codec and codec controller. The codec includes two separate chips, one for primarily analog applications and one for primarily digital applications. By separating the functions performed between the analog and digital chips, individual yields can be improved which lead to overall cost reduction for the system.

The codec performs digital-to-analog conversion (DAC) and analog-to-digital conversion (ADC), mixing, analog processing, and modem codec functions. The codec functions as a slave to a digital codec controller, which, in turn, is connected to the CPU of the PC, as shown in FIG. 1. The codec communicates with the codec controller through a digital serial link, referred to as the AC-link bus. The codec performs the appropriate data conversion and communicates analog signals to an input/output device. The AC-link bus was specifically designed to directly connect the codec to the codec controller. In prior PC architectures, it was necessary to connect an interface device between a codec and the core logic controlling the codec. The AC '97 eliminates the need for a separate interface device to be incorporated by utilizing the AC-link bus to directly connect the codec to the codec controller.

The AC-link bus is a bi-directional, 5-wire, serial time-division multiplexed (TDM) interface designed for a dedicated point-to-point interconnect, as illustrated in FIG. 2. All digital audio streams, modem line codec streams, and command/status information are communicated over the AC-link bus in data packets. The AC-link bus architecture has a defined protocol which divides each data packet into 12 outgoing and 12 incoming data streams. Each of the data streams are positioned in a respective one of the 12 TDM slots in the data packet, as shown in FIG. 3. The output data streams correspond to the multiplexed bundles of all digital output data targeting the codec's DAC inputs and control registers.

The industry consortium developing the AC '97 architecture wanted to promote interoperability between codecs and codec controllers produced by different vendors to function according to AC-link protocol. Thus, strict adherence to the specified audio input and output frame slot definitions, AC-link bus protocol, and electrical timings are required for interoperability to be maintained between various codecs and codec controllers. The AC-link bus basically performs one function, it transmits the data streams in the data packets defined by the AC-link protocol between the codec controller and the codec, so that the AC-link bus merely provides a direct data link between the codec and the codec controller.

No significant data manipulation can be performed on the data streams communicated through the AC-link bus defined by the industry consortium. If it is desirous to manipulate any of the data streams in a data packet, it is necessary to send the data packet through the codec controller to the host CPU of the PC where a data manipulation algorithm can perform the desired function. There are many types of data applications which require hardware acceleration, including Head Related Transfer Function (HRTF) algorithms, AC3 decode, MPEG decode, music synthesis, downloadable sound (DLS) synthesis assistance, encryption/decryption, reverb, modulation/demodulation, security protocol, compression/decompression, filtering, adding delays or special effects, and any communication protocol. These acceleration functions typically require signal processing or data manipulation algorithms to be performed by the host CPU. After performing the desired acceleration function, the processed signal must then be transmitted back through the codec controller, through the AC-link, and to the codec, where it is transmitted to the respective input/output device. However, requiring the host CPU to perform signal acceleration functions can be inefficient, since certain signal acceleration applications require real-time access to the data in order to function properly. The architecture of the AC '97 set forth by the industry consortium does not define such real-time data manipulation to be performed on signals transmitted across the AC-link bus.

There is clearly a need for a system and method for performing signal acceleration on the data streams of data packets transmitted over an AC-link bus directly in a real time manner. Moreover, there is a need for a system and method for performing signal acceleration on the data streams of data packets transmitted over an AC-link bus in a flexible and efficient manner without having to send the data streams through the codec controller to a host CPU to perform the desired acceleration function.

SUMMARY OF THE INVENTION

It is a primary object of the present invention to overcome the aforementioned shortcomings associated with the prior art.

The present invention provides a system and method for performing real-time signal acceleration of data streams communicated over an AC-link bus.

These as well as additional advantages of the present invention are achieved by providing a system and method for performing signal acceleration on an AC-link bus by positioning an accelerator directly in the communication path of the AC-link bus situated between a codec and its respective codec controller. The codec connected to the AC-link bus is configured for a particular AC-link bus protocol, so that the codec recognizes which type of data stream appears in a data packet received over the AC-link bus. Currently, the AC-link bus protocol defines twelve (12) TDM data slots, where each data slot is assigned a respective data stream accomplishing a particular function with one of the data slots containing TAG information about the data packet. The codec then performs any necessary data conversion and transmits the data appearing in a particular TDM slot to an associated input/output device. The accelerator is connected to the AC-link bus such that signal processing or data manipulation is performed by the accelerator on the data packets communicated across the AC-link bus, and the processed data packets are transmitted to one or multiple codecs according the same communication protocol.

The accelerator is connected between a codec and its respective codec controller, so that the accelerator is arranged to receive signals traveling through the AC-link bus. This allows the accelerator to have real-time access to the input and output data streams traveling through the AC-link bus, so that signal processing or data manipulation can be performed without multiple communications to the codec controller or host computer CPU.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for performing acceleration on signals transmitted over an AC-link bus.

Referring back to FIG. 3, the slot assignments for the data streams comprising each incoming and outgoing TDM data packet transmitted across the AC-link bus according to the AC-link bus protocol are illustrated. The AC-link bus protocol defines twelve (12) TDM data slots, where each data slot is assigned a respective data stream corresponding to a particular function. The codec connected to the AC-link bus is configured for this AC-link bus protocol, so that the codec recognizes which type of data stream appears in a particular TDM data slot. The codec then performs any necessary data conversion and transmits the data appearing in a particular TDM slot to its associated input/output device. For instance, slots 3 and 4 on both the incoming and outgoing data frames contain data streams for left and right speaker devices, respectively. The codec will perform digital-to-analog conversion on the outgoing data stream appearing in slot 3 of the data frame received from the AC-link bus and transmit the converted signal to the left speaker as well as performing analog-to-digital conversion of incoming data from the left speaker and place the digital data into slot 3 of the incoming data frame.

Figure 1:
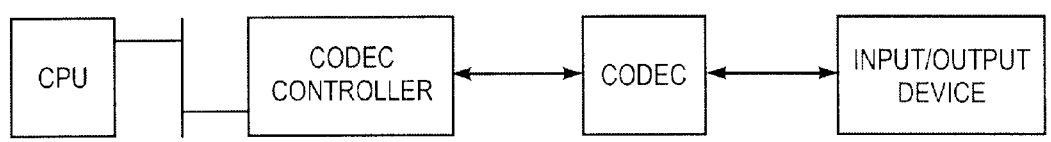
FIG. 1 is a schematic block diagram of an Audio Codec '97 computer architecture.
Figure 2:
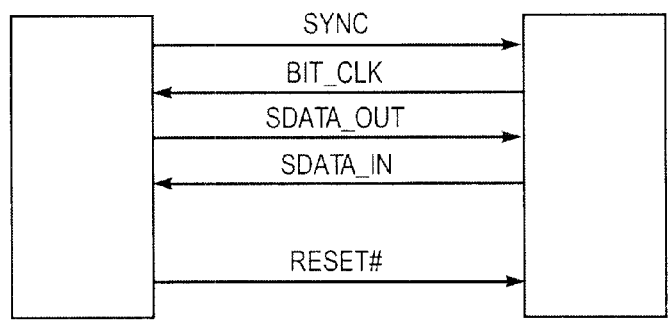
FIG. 2 is a schematic block diagram of the AC-link bus connection between the codec and companion controller of the Audio Codec '97 architecture of FIG. 1.
Figure 3:
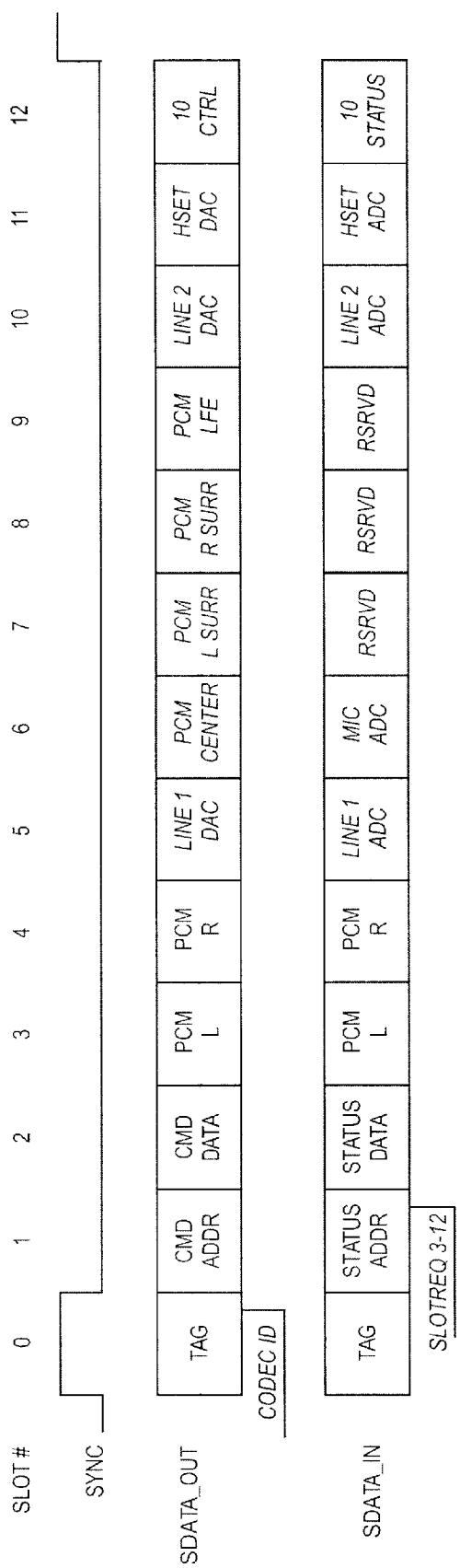
FIG. 3 shows the time-division multiplexed (TDM) slot assignment protocol for the input and output data frames transmitted across the AC-link bus of FIG. 2.
Figure 4:
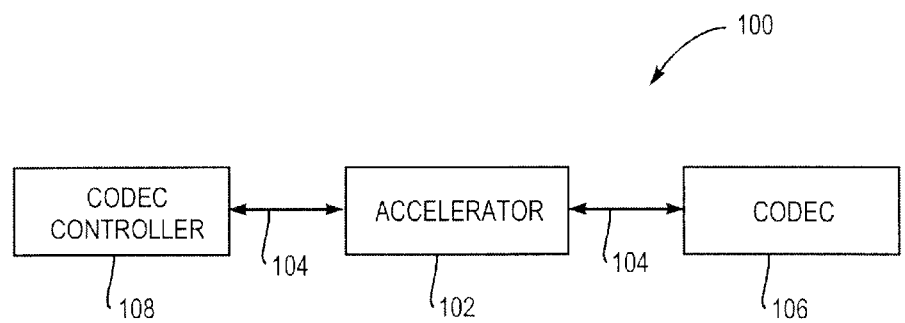
FIG. 4 is a schematic block diagram of a preferred embodiment of the system for performing signal processing on an AC-link bus of the present invention.

The system 100 of the present invention positions an accelerator 102 in the communication path of an AC-link bus 104 connecting a codec 106 to a respective codec controller 108, as illustrated in a block schematic diagram in FIG. 4. This allows predetermined data streams in the TDM slots of the data packets transmitted across the AC-link bus 104 to be passed through the accelerator 102 as they are passed between the codec 106 and codec controller 108. Codec 106 may comprise any device which functions as an analog front end to the system 100. Further, the codec 106 and codec controller 108 selected for the system 100 should operate using a digital TDM data packet protocol similar to the AC-link bus protocol shown in FIG 3. The AC-link bus protocol defined by the industry consortium is set forth in the *Audio Codec '97Component Specification*, Revision 1.03, released Sep. 15, 1996 by the Audio Codec '97 Working Group, *Audio Codec '97*, Revision 2.0, released Sep. 29, 1997 by Intel Corporation, and *Audio Codec '97*, Revision 2.1, released May 22, 1998 by Intel Corporation. The disclosures of Revisions 1.03, 2.0, and 2.1 of the Audio Codec '97 are hereby incorporated by reference into this disclosure. While the present invention is specifically described as solving limitations presented by the Audio Codec '97, it is understood that the present invention may also be applied to any digital serial link bus designed to direct connect a codec to its respective codec controller.

The accelerator 102 is connected between the codec 106 and codec controller 108 in a transparent manner, so that the codec 106 and codec controller 108 continue to operate according to the AC-link bus protocol which is not affected by the operation of the accelerator 102. The accelerator 102 performs data manipulation of selected data streams in the data packets transmitted across the AC-link bus 104, which may include signal processing or any type data manipulation function. The accelerator 102 then places the processed data streams back into their respective TDM slots in the transmitted data packet, and the processed data packet is output back onto the AC-link bus 104. Any number of the data streams within a data packet may be processed by the accelerator 102. Each data packet transmitted over the AC-link bus 104 includes TAG information appearing in its first TDM data slot which may be used to instruct the accelerator 102 which portions of the data packet to process for performing the desired acceleration function. Thus, the accelerator 102 only modifies the data streams in the data packet needed for acceleration, and the remaining data streams of the packet are left alone so that other standard devices can co-exist on the AC-link bus 104 with the accelerator 102.

Figure 5:
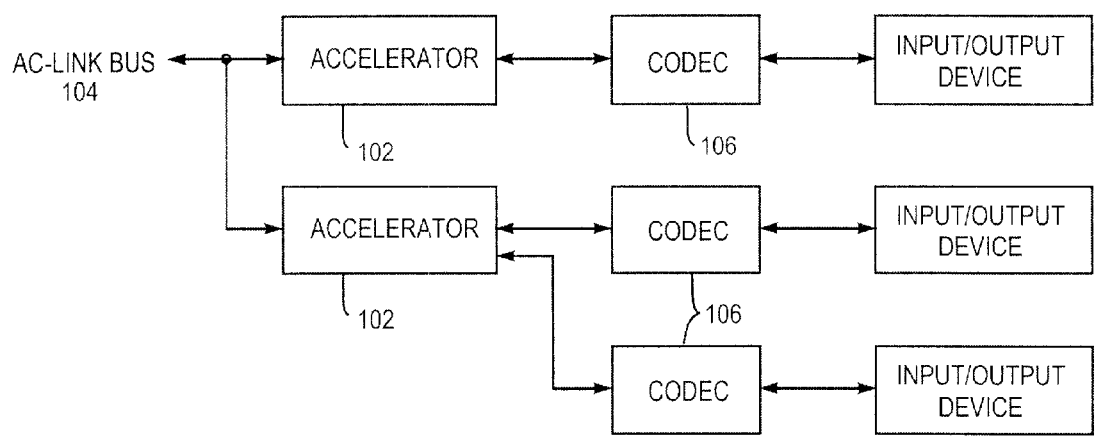
FIG. 5 is a schematic block diagram of an alternative embodiment of the system for performing signal processing on an AC-link bus of the present invention.

This arrangement also allows multiple accelerators 102 and/or codecs 106 to be connected to the AC-link bus 104 to perform a variety of functions. Referring to FIG. 5, one possible embodiment of the system 100 incorporating multiple accelerators 102 and codecs 106 is illustrated. Each accelerator 102 may be connected to either one or a plurality of codecs 106. It is also possible to arrange a plurality of accelerators 102 in series with one another along the AC-link bus 104.

By providing the accelerator 102 between the codec 106 and codec controller 108, the accelerator 102 has real-time access to the data packets communicated over the AC-link bus 104. This allows certain signal acceleration functions to be performed more efficiently and with an improved quality over previous architectures which required the use of the codec controller 108 and host CPU to accomplish such data manipulation. In order to allow the codec 106 and codec controller 108 to send and receive data packets normally according to AC-link bus protocol while also performing signal acceleration on desired data streams in the data packets, the accelerator 102 preferably acts in a transparent manner with respect to the codec 106 and codec controller 108.

Figure 6:
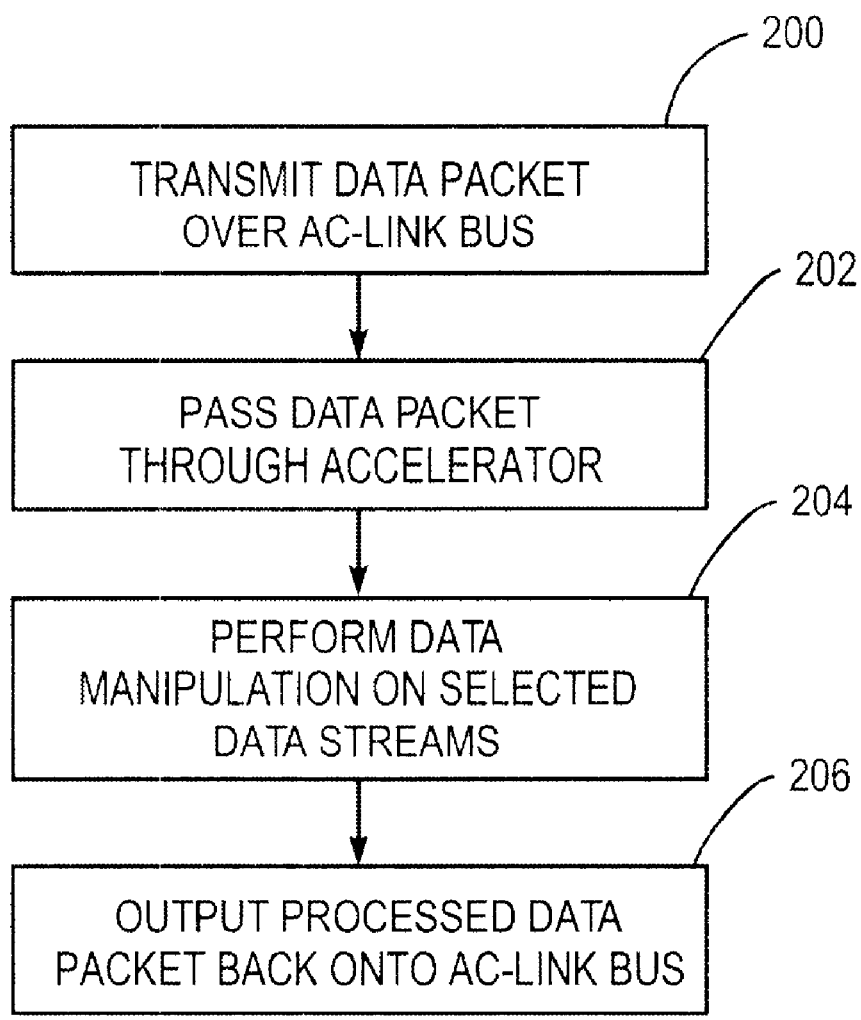
FIG. 6 is an operational block diagram of a preferred method of the present invention for performing signal processing on an AC-link bus.

Referring now to FIG. 6, an operational block diagram of the method for performing signal acceleration on the data packets communicated through an AC-link bus 104 is illustrated. Initially in step 200, a data packet is transmitted over the AC-link bus 104 according to the AC-link bus protocol as shown in FIG. 3 or similar TDM serial protocol. The data packet may either be an outgoing data packet prepared by the codec controller 108 or an incoming data packet prepared by the codec 106. The data packet transmitted over the AC-link bus 104 is passed through the accelerator 102 positioned in the communication path of the AC-link bus 104 in step 202. The accelerator 102 performs the desired data manipulation on selected data streams in the data packet in step 204. The processed data streams are then placed back into their respective TDM slots in the data packet, and the data packet is transmitted back onto the AC-link bus 104 according the same communication protocol in step 206. When transmitted to the codec 106, the codec 106 then receives the processed data packet and forwards the data streams onto their respective input/output devices.

The accelerator 102 can perform a number of different data manipulation functions, depending upon the particular input/output device connected to the codec 106. The accelerator 102 can either be configured to perform a specific type of signal processing or, alternatively, can be formed to be reconfigurable, such as by specific application programs downloaded onto the personal computer. The accelerator 102 may comprise any type of device which performs data manipulation functions to achieve signal acceleration, including by way of example a digital signal processor (DSP), a multiply-accumulate cell (MAC), a small multiprocessing unit (MPU), or a state machine having a fixed set of clocked hardware blocks.

For audio information appearing in the data packets transmitted over the AC-link bus 104, the AC-link bus 104 was designed to send pre-rendered data directly to a codec 106 for output to speakers or other audio devices. Recently, it has become common to combine the digital codec controllers 108 into the core-logic of the host CPU. For instance, the codec controller 108 may either be a stand-alone device or an integrated motherboard device such as a PCI bridge. Previous audio acceleration algorithms required the us e of the host CPU for rendering these acceleration functions, since such acceleration functions could not be performed out on the AC-link bus 104. For many types of audio data, this causes a strain on the host CPU and slows down the interactive nature of many PC audio subsystems. By positioning accelerators 102 along the communication path of the AC-link bus 104, the system 100 of the present invention improves the efficiency and performance of audio codecs 106 by reducing the load on the host CPU.

In order to perform modem acceleration for modem data streams appearing in the data packets transmitted over the AC-link bus 104, the accelerator 102 may comprise a hardware datapump for performing modulation of the data streams. Previously, such modulation was performed by the host CPU. This allows hardware datapump acceleration to be added to the AC-link bus 104 without the need for an additional control devices such as a support chip. Again, the accelerator 102 acts in a transparent manner so as not to affect the AC-link bus protocol operation of the codec 106, AC-link bus 104, or codec controller 108.

Certain control information is transmitted along with each data packet to inform the accelerator 102 as to which data packets and, in particular, which data streams in the data packets require data manipulation to accomplish the desired acceleration function. In the preferred embodiment of the present invention, the accelerator 102 is positioned directly in the communication path of the AC-link bus 104 so that both the data packets entering and the data packets exiting the accelerator 102 are formed in accordance with the AC-link bus protocol. In an alternative embodiment of the present invention, the data packet entering the accelerator 102 may be formed according to a different protocol, where the accelerator 102 will perform the desired data manipulation and place the processed data streams into a data packet formed in accordance with the AC-link bus protocol. Thus, data packets input into and output from the accelerator 102 may be formed according to separate respective protocols. In this manner, a larger bandwidth can be input into the accelerator 102 than is output by the accelerator 102, where the output data packet will be recognizable by the codec 106 configured for the AC-link bus protocol.

As can be seen from the foregoing, a system and method for performing signal acceleration on an AC-link bus formed in accordance with the present invention allows real-time data manipulation to be performed on data streams communicated over an AC-link bus. Moreover, by forming a system and method for performing signal acceleration on an AC-link bus in accordance with the present invention, signal acceleration functions can be performed on data streams communicated to and from a codec without requiring access to a host CPU or codec controller.

In each of the above embodiments, the structures of the system and method for performing signal acceleration on an AC-link bus of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. For instance, the present invention may be readily applied to variations of the TDM data packet protocol described above. Therefore, it is to be understood that, within the scope of the appended claims, the invention may be practiced other than as specifically described herein.

What is claimed is:

1. A system for performing signal acceleration on data signals communicated over an AC-link bus designed to directly link a codec to a codec controller, comprising:

a codec arranged to communicate signals to an input/output device, a codec controller which controls the operation of the codec;

an AC-link bus connected to provide a communication path for data signals transmitted between the codec and the codec controller; and an accelerator arranged between the codec and the codec controller, wherein the accelerator is arranged to receive and perform signal acceleration on at least a selected portion of the data signals transmitted over the AC-link bus.

2. The system of claim 1, wherein the accelerator is positioned along the communication path of the AC-link bus directly in the point-to-point connection between the codec and the codec controller.

3. The system of claim 1, wherein the signals are transmitted across the AC-link bus in packets of digital data according to a predetermined protocol, wherein the accelerator performs signal acceleration on the selected portion of the data signals and outputs the data packets according to the predetermined protocol of the AC-link bus.

4. The system of claim 3, wherein the predetermined protocol for the AC-link bus defines each data packet to include a plurality of time-division multiplexed data slots, each of the data slots containing a respective data stream.

5. The system of claim 3, wherein the accelerator receives the data signals according to a protocol different from the predetermined AC-link bus protocol and modifies the data signals according to the predetermined AC-link bus protocol.

6. The system of claim 3, wherein the accelerator receives the data signals according to the predetermined AC-link bus protocol and modifies the data signals according to a protocol different from the predetermined AC-link bus protocol.

7. The system of claim 1, wherein the accelerator is programmable such that the signal acceleration function performed may be variably controlled.

8. A method of performing data manipulation of data signals communicated over an AC-link bus designed to directly link a codec to a codec controller, comprising the steps of:

transmitting the data signals between the codec and codec controller;

passing the data signals through an accelerator positioned in a communication path between the codec and the codec controller;

performing a data manipulation function on at least a portion of the data signals passed through the accelerator; and outputting the accelerated data signals from the accelerator onto the AC-link bus linking the codec to the codec controller.

9. The method of claim 8, wherein the data signals are communicated in packets of digital data according to a predetermined communication protocol.

10. The method of claim 9, wherein the predetermined protocol for the bus defines each digital data packet to include a plurality of time-division multiplexed data slots, each of the data slots containing a respective data stream.

11. The method of claim 9, wherein the accelerator outputs the accelerated data signals in packets of digital data formed in accordance with a protocol for the AC-link bus.

12. The method of claim 11, wherein the accelerator receives the data signals in packets of digital data formed according to a protocol different from the protocol of the output data packets.

13. The method of claim 9, further comprising the step of transmitting control information in the packets of digital data in order to inform the accelerator which portions of the data packets are to be accelerated.

* * * * *